Nov. 11, 1958 C. J. JAWORSKI ET AL 2,859,868

TAPE REEL PACKAGE

Filed May 23, 1956 2 Sheets-Sheet 1

INVENTORS,
CHARLES J. JAWORSKI,
JAMES J. LA DUE
BY Harry T. Berriman
AGENT

Nov. 11, 1958 C. J. JAWORSKI ET AL 2,859,868

TAPE REEL PACKAGE

Filed May 23, 1956 2 Sheets-Sheet 2

United States Patent Office 2,859,868

Patented Nov. 11, 1958

2,859,868

TAPE REEL PACKAGE

Charles J. Jaworski, Wappingers Falls, and James J. La Due, Poughkeepsie, N. Y., assignors to International Business Machines Corporation, New York, N. Y., a corporation of New York Application May 23, 1956, Serial No. 586,706

4 Claims. (Cl. 206—59)

This invention relates to containers for rolls of magnetic tape, photographic film, or the like.

In the utilization of magnetic tape, photographic film etc., the tape or film is wound on suitable reels from which it is fed to the particular apparatus with which it is used, the tape or film after use being rewound on similar reels. In transporting reels of tape or film from one physical location to another, or in storing the reels of tape or film, each reel is usually packed in a container of the general shape of the reel and large enough to receive the reel. In such a container, the reel usually rests on its one side or the other, or on the edge, dependent upon the position of the container. With such contact between the reel and container, shocks imparted to the container during transportation and handling are transmitted to the enclosed reel and tape or film wound thereon and may not only damage the reel edges or sides, but the tape or film itself.

In the present invention there is provided an improved reel container wherein the reel is firmly supported therein at a hub portion of the reel, the sides and the edges of the reel being free of contact with any surface of the container so that damage to the reel and the tape or film carried thereon, during transportation, storage, and handling is prevented.

The improved reel container is formed as two open topped cylindrical covers of suitable dimensions so that they may be engaged to form a pillbox like container, each cover including a shoulder surface against which integral hub surfaces of the reel are engaged when the reel is placed within the covers. The one cover member has mounted therein a locking device which includes operating portion which extend through that cover, through the center of the reel hub when arranged in the container, and then through the other cover member to the outer surface thereof. Upon a rotation of the locking device, the operating portions thereof deflect the two shoulder surfaces of the two covers towards each other so as to firmly grip the reel at its hub surfaces only and lock it within the container against lateral or axial movement relative to the container.

The improved container includes a further improvement of having a raised concentric beading on the outer surfaces of the cover, the beadings being such as to permit the containers to be stacked when laid flat, with each beading meshing the beading of its neighbor container so that the containers will not slide.

It is accordingly an object of invention to provide an improved container for transporting and handling magnetic tape or film in such a fashion that the possibility of damage to the reel and its contents is substantially eliminated.

It is a further object of the invention to provide an improved container for transporting and storing magnetic tape or photographic film reels wherein the reel is rigidly supported within the container at only a hub portion of the reel, the sides and edges of the reel being free of engagement with the interior of the container to prevent injury to the reel or the film or tape thereon if the container is jolted or dropped.

A further object is to provide an improved film or tape reel shipping and storage container wherein the combined weight of the tape film and the reel on which it is wound is transmitted to the container through a hub of the reel, and there is no weight transmitted through the circumferential edges or the sides of the reel.

Another object is to provide an improved shipping and storage container for tape or film reels wherein the reel is supported within the container free of contact with the container except at a hub portion of the reel, the reel being locked within the container free of axial or rotational motion relative to the container.

Another object is to provide an improved film or tape reel shipping and storage container wherein the reel is rigidly supported by a coaction between a hub of the reel and shoulder surfaces of the container, other surfaces of the reel being free from contact with the interior of the container, the shoulder surfaces of the container being flexed to tightly grip the hub of the reel by a unique locking device.

Another object of the invention is to provide an improved film or tape reel shipping and storage container wherein the top and bottom outer surfaces of the container are essentially flat but include extending concentric beadings and wherein a plurality of such containers may be stacked flatwise or edgewise, the concentric beadings of the top and bottom surfaces of adjoining containers intermeshing so the containers form a compact and interlocked group.

Other objects of the invention will be pointed out in the following description and claims and illustrated in the accompanying drawings, which disclose, by way of example, the principle of the invention and the best mode, which have been contemplated, of applying that principle.

Figure 1:
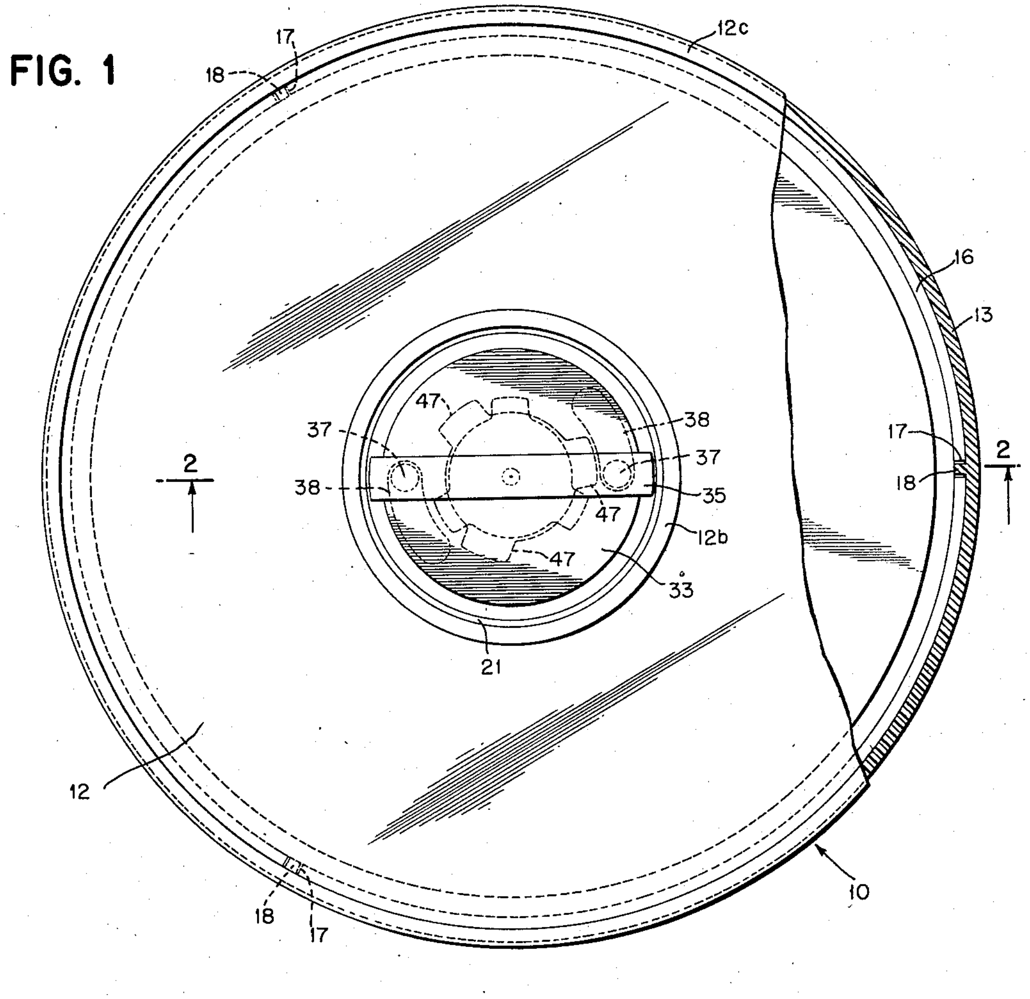
Fig. 1 is a plan view of the improved tape or film reel container with a tape reel arranged therein and wherein to facilitate illustration, part of the container is broken away, and portions of the container locking device and cooperating parts are shown in phantom.
Figure 2:
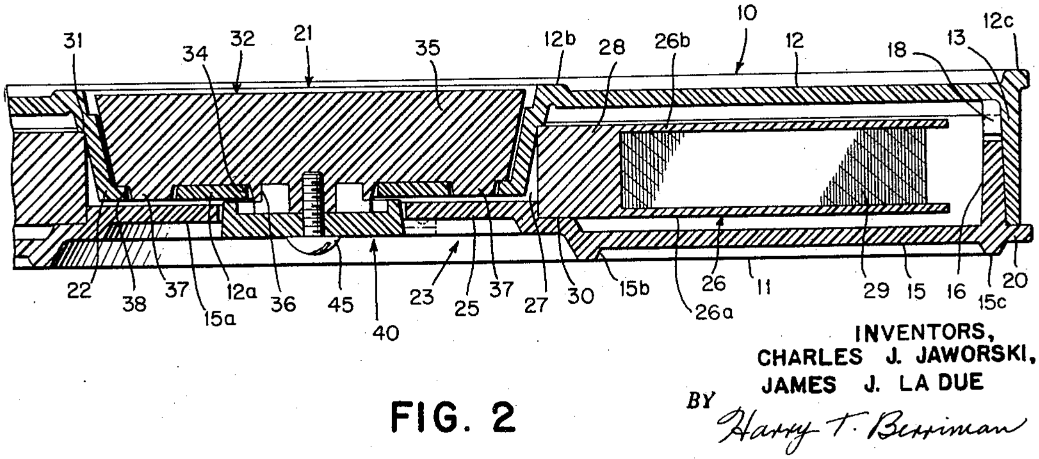
Fig. 2 is a partial vertical section view taken on the plane of the line 2—2 of Fig. 1.

Referring now to Figs. 1 and 2, the improved tape or film reel container comprises a pair of closure members generally indicated 10 and 11 in Fig. 1. The member 10 is formed as an open ended cylinder and includes a generally disc shaped main body portion 12 having an integral, laterally projecting flange or side wall 13. Closure member 11 is also formed as an open ended cylinder and includes a generally disc shaped main body portion 15 having an integral laterally projecting flange or side wall 16. The overall diameter of the two disc portions 12 and 15 of the two closure members are identical, however, the diameter of the flange 16 of closure member 11 is less than the diameter of the flange 13 of closure member 10 by an amount sufficient for the two covers to be interfitted, open ends first, to form a pillbox like container, as indicated. The flange 16 of the closure member 15 contains three spaced notches 17, which are adapted to receive three similarly spaced fingers 18 which project from the inner surface of the flange 13 of the closure member 10. Before the two closure members may be completely interfitted, they must be angularly positioned relative to each other so that the notches 17 and fingers 18 are aligned. Thereafter, the two closure members may be interfitted until the edge of the flange 13 abuts an extending portion 20 of the disc portion 15 of member 11. The reason for having the two closure members angularly aligned in a particular position before they can be fully interfitted, will be later evident.

Referring to Fig. 2 it will be noted that the central portion of the disc member 12 of closure member 10 is contoured inwardly to form a cavity, generally designated 21, in the outer surface of the disc, and to form a corresponding hub portion 22 in the inner surface of the disc. In a similar manner, the central portion of the disc member 15 of the closure member 11 is contoured inwardly to form a cavity, generally designated 23, in the outer surface of the disc, and to form a corresponding hub portion 25 in the inner surface of the disc. It will be noted that cavity 21 is deeper than the cavity 23, and correspondingly, the hub 22 is longer than the hub 25.

To position the tape or film reel within the container, the reel which is designated 26 in Figs. 1 and 2 and has a circular aperture 27 through a central hub portion 28 thereof, is placed within the closure member 11 so that the hub portion 25 of the latter extends into the aperture 27, the aperture being slightly larger in diameter than the hub portion 25 of closure member 11. With the reel so positioned, a limited area of the side of the reel hub 28 proximate the member 15 and immediately surrounding the reel aperture 27, engages an offset shoulder portion 30 of the hub portion 25 of body member 15. It will be particularly noted that the reel 26 engages the closure member 11 only at one side of the hub portion of the reel, a wall 26*a* of the reel and adjacent to body portion 15 of closure member 11, being spaced therefrom as indicated (Fig. 2). The outer edge of the reel side wall 26*a* is also spaced from flange 16 of closure member 11. The side wall 26*a* of the reel is integral with and extends from the one end of the reel hub 28 as shown in Fig. 2. A similar side wall 26*b* extends from the other end of the reel hub 28 and is spaced from the side wall 26*a*, as shown. A coil of film in tape 29 is wound on the reel hub with the lateral edges of the coil being confined between the side walls 26*a* and 26*b* as indicated.

With the loaded reel 26 positioned within closure member 11 as described above, closure member 10 is then interfitted with member 11 as explained previously, the hub portion 22 of member 10 extending into the aperture 27 of the reel 26, as indicated. With the two closure members completely interfitted, an offset shoulder portion 31 of the hub portion 22 seats against an area of the side of the reel hub 28 proximate the member 12 and immediately surrounding the reel aperture 27. It will be noted that the reel 26 also engages the closure member 10 only the hub portion of the reel, the surface of the side wall 26*b* of the reel adjacent body portion 12 of closure member 10 being spaced therefrom as indicated.

In the embodiment of the invention shown, each of the closure members 10 and 11 is formed of a tough, plastic material such as styrene, which may be flexed slightly by the application of suitable pressure thereto. With the reel 26 arranged within the interfitted closure members 10 and 11 and engaged at its hub portion by the shoulder surfaces 30 and 31, the shoulder surfaces are displaced slightly towards each other by a unique locking device, generally indicated as 32, so as to firmly grip the reel and prevent any axial or rotational movement of the reel relative to the container.

The locking device 32 comprises a disc portion 33 of a proper diameter to fit within the bottom of the cavity 21 and be capable of angular motion therein on the adjacent surface of portion 12*a* of body portion 12. Secured to the disc 33 and extending upwardly and diametrically thereon is a handle 35, it being noted that the top surface of the handle is slightly below the uppermost surface of closure member 10. Extending downwardly from the central undersurface of the disc 32, is an integral cylindrical extension 36 which is adapted to rotatably engage a suitable mating opening 34 through the portion 12*a* of body portion 12. The extension 36 projects very slightly past the undersurface of portion 12*a* as indicated in Fig. 2.

Extending downwardly from diametrically opposed areas of the undersurface of the disc 33 is a pair of integral pins 37 each of which is adapted to operationally engage a correspondingly arcular slot 38 (Figs. 1 and 2) in the bottom portion 12*a*. The ends of the pins 37 are flush with the undersurface of the portion 12*a* as indicated in Fig. 2. It will be appreciated that by a manual operation of the handle 35, the associated disc 33 may be displaced angularly within the cavity 21 between a first position wherein each of the guide pins abut the solid surface adjacent the one end of the related slot 38, to a second position wherein they abut the solid surface adjacent the other end of the slots 38, and vice versa.

Referring now to Figs. 2, 3 and 4, and 5, it will be noted that the locking device 32 includes a latch lock member which is generally designated 40. The latch member comprises a disc like main body member 41 which includes an elongated recess 42 in the center of its top surface (see Figs. 4 and 5) into which a similarly shaped protrusion 42 extending from the under side of the cylinder 36 meshes, thus locking the latch member 40 and disc 33 together for angular motion. The member 40 also includes semi-circular shaped extensions 43 each of which meshes a mating cavity 44 of extension 36 of disc 32. A screw fastening extends from the undersurface of the member 40 through a suitable opening in the disc 41, to the extension 36 and disc 33 and into a suitable threaded insert secured therein to maintain the latch lock member 40 and disc 33 secured together against both angular and lateral movement relative to each other.

Extending outwardly from the lower portion (see Figs. 4 and 5) of the rim of the disc body member 41 at equally spaced angular intervals are 3 so-called latch fingers 46. The upper surfaces (in Figs. 4 and 5) of the three fingers are inclined as indicated. With a tape or film reel positioned in the one closure member 11, the other closure member 10 may be partially interfitted therein by aligning the two closure members so that the fingers 18 will engage the notches 17, as previously mentioned. As the two closure members are interfitted or prior to starting to interfit them, the handle 35 of the locking device 32 is rotated to angularly position the locking device 32 relative to the closure member 10 so that the pins 37 thereof are in their extreme counter-clockwise position (in Fig. 1) in the related slots 38 of the closure member 10. With the locking device so positioned relative to closure member 10, the three latch fingers 46 of the associated latch device 40 will be properly aligned with three related clearance openings 47 (see Fig. 3) cut in the central section 15*a* of member 15, so that the latch lock member 40 will extend through section 15*a* and permit the two closure members to be completely interfitted. With the closure members completely interfitted, the lower edge of the inclined surface of each of the fingers 46 will just clear the bottom surface (in Fig. 2) of the section 15*a* of the closure member 11.

Figures 3, 4, 5:
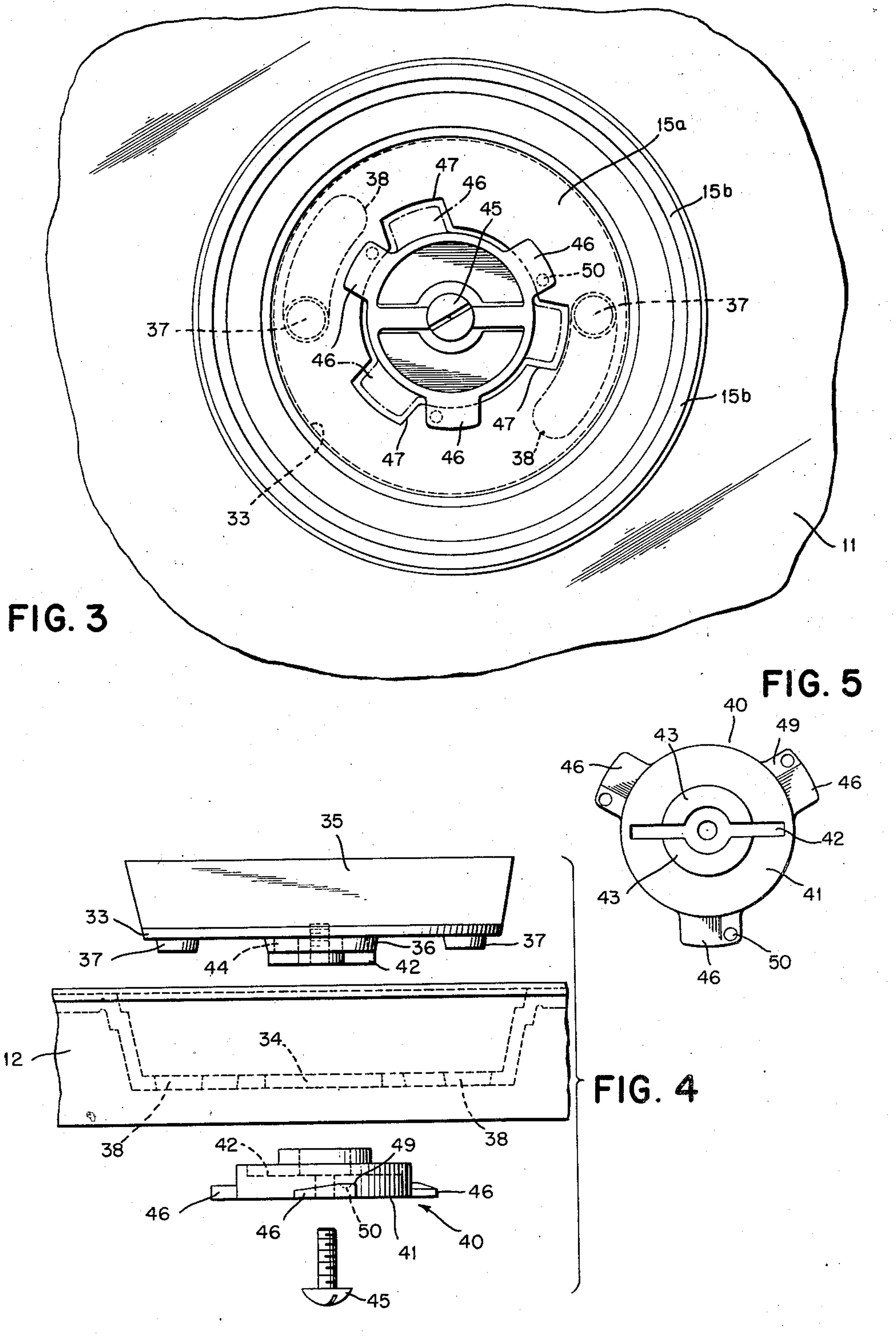
Fig. 3 is a partial bottom view of the improved container and illustrates, in particular, some of the structure of the centrally arranged locking device.
Fig. 4 is an exploded view of the container locking device and its supporting structure.
Fig. 5 is a plan view of the latch lock member of the container locking device.

The two closure members are then locked together and the reel rigidly secured therein, by rotating the handle into the position indicated in Figs. 1 and 3. As the handle is rotated, the latch lock member 40 is rotated therewith and increasing higher portions of the inclined surfaces of the associated fingers 46 are brought into contact with the under surface of the member 15*a* adjacent the clearance opening 47, as best indicated in Fig. 3.

As a result, the section 15a of the closure member 11 and section 12a of closure member 10 are drawn towards each other, since the disc 33 and latch lock member 40 are secured by screw 45 against movement relative to each other. The deflection of sections 12a and 15a effects a corresponding deflection of the associated hubs 25 and 22 and their shoulders 30 and 31, the deflection of the shoulders effecting a gripping of the reel at its hub 28. As the latch lock member 40 is rotated into its extreme locking position, a non-inclined portion 49 of each of the fingers 46 is moved into engagement with the related area of the undersurface of section 15a. This non-inclined portion of each of the fingers 46 includes a semi-circular shaped depression 50 which is engaged by a mating semi-circular protrusion 51 from the corresponding undersurface area of section 15a as the locking member reaches its extreme locking position. The non-inclined surface 49 and the meshing of each of the related depressions 50 and protrusions 51 for each of the latch fingers 46, maintains the locking device in the locked position after the handle 34 is released. With the closure members 10 and 11 locked together, the enclosed tape or film reel is firmly gripped at its hub portion only, the remaining outer surfaces of both sides of the reel and also the rim of the reel being free of contact with any portion of the closure members, as previously mentioned. By supporting the reel within the container in this fashion, shocks or jolts applied to the container are transmitted only to the reel through its hub, thus substantially limiting the possibility of damage to the reel and its contents. In order to remove a reel from a locked container, the handle 35 and in turn the associated locking device 32 is rotated from the extreme "locked" position as shown in Figs. 1 and 3, to its extreme position wherein the fingers 46 are again aligned with their clearance openings 47 in portion 15a of the closure member 11, as indicated in phantom in Fig. 3. Thereafter, the handle 35 is lifted to remove the closure member 10 from the closure member 11 and expose the tape reel, the reel then being removed from the lower closure member.

It will be noted in Fig. 2 that when the improved container is closed, the locking device 32 is enclosed completely within the outer planes of the sections 12 and 15 of the associated closure members 10 and 11, respectively, so that a plurality of the containers, either loaded or unloaded with reels, may be positioned flatwise adjacent each other in a compact group. In arranging a number of containers in such a group, the containers are arranged with the closure members 10 or 11 in the same direction so that concentric beadings 12b and 12c of closure member 10, and similar concentric beadings 15b and *c* of closure member 11 of a container, each meshes the adjacent beading of the alternate closure member of the adjacent container. The intermeshing beadings of adjacent containers in a stack serve to prevent slipping of one container on another so that a compact stack is maintained. A single container or a stack of containers may be stored either flatwise or on edge as desired.

While there have been shown and described and pointed out the fundamental novel features of the invention as applied to a preferred embodiment, it will be understood that various omissions and substitutions and changes in the form and details of the device illustrated and in its operation, may be made by those skilled in the art without departing from the spirit of the invention. It is the intention therefore to be limited only as indicated by the scope of the following claims.

What is claimed is:

1. A storage device for elongated material such as tape, wire, film and the like, said device comprising, in combination, a reel having spaced side wall members and a hub having an aperture therethrough, container means for said reel comprising a container body having an extending flange section, and a lid having an extending flange section interfittable with the flange section on said container body to form a container, said container body and lid each being capable of limited flexure at a predetermined area thereof, said body and lid each including at said predetermined area, an inwardly extending member adapted to engage a related area of said reel hub when the reel is enclosed in said container, said extending members maintaining said reel with the side walls and the edges thereof free of engagement with any inner surfaces of said container, a locking device carried by said container lid and including a lock member having an extended surface which engages said predetermined area thereof on the outer surface of said lid, said lock member including a handle secured thereto, an axial member secured at one end to said lock member and extending laterally therefrom through a suitable opening in said lid, said axial member also extending through said reel hub aperture when the reel is arranged in said container, a latch lock member secured to the other end of said axial member and including a plurality of spaced members each having an inclined surface, said container body including spaced openings through which said spaced members pass as the reel is enclosed in said container, the inclined surfaces of said spaced members upon a rotation of said handle after said lid and body are interfitted, having succeeding inclined portions thereof engaged with adjacent areas of said container body predetermined area with the said predetermined areas of the container body and lid and their associated extending members being deflected towards each other, the extending members accordingly rigidly gripping said reel at the hub thereof to prevent axial or lateral motion thereof within said container.

2. A storage device as in claim 1 characterized further by the fact that said lock member includes a projecting member extending from the underside thereof and adapted to engage an arcuate slot in the adjacent lid area, the rotation of said handle and in turn said associated locking device being limited between first and second positions by the engagement of said projecting member with the lid area adjacent each end of said arcuate slot, said locking device when in said first position locking said reel in said container and when in said second position, releasing said reel.

3. A storage device as in claim 2 characterized further by the fact that said lid flange includes a plurality of spaced guide fingers and said body flange includes a mating group of guide slots, said flanges being capable of interfitting only if said guide fingers and guide slots are aligned by a corresponding alignment of said lid and container body, said fingers of said lid and said slots of said container body being arranged relative to said arcuate slot and said spaced openings of the lid and container body, respectively, so that with said locking device positioned in its second position and said lid and container body aligned for interfitting, said latch lock spaced members are aligned to freely pass through said container body spaced openings.

4. A storage device for elongated materials such as tape, film, wire, or the like, said device comprising, in combination, a reel having a centrally apertured hub section and spaced side walls, a pair of closure members each having a planular main body section with a laterally projecting flange section, said closure members being interfittable at their flange sections to form a container, each body section being contoured inwardly at a central area thereof to form a cavity on the outer surface of said related body section and a hub section on the inner surface of said related body section, the reel aperture being engaged by said hubs when the reel is arranged within said container, said hubs including shoulder sections extending therefrom of a dimension greater than said reel aperture and each adapted to seat against the adjacent side of said reel at the hub section thereof to support said reel with the sides and marginal edges free of contact with the inner surfaces of said container, each said central areas being adapted for limited flexure in a direction toward or away from the reel when arranged in said container, a locking device for said container comprising a manually operable member completely enclosed in the cavity of one of said closure members and engaging for angular motion thereon the surface of said related closure member adjacent the bottom of that cavity, an axial member secured at one end to said manually operable member and extending therefrom through an opening in that central area at bottom of said related cavity and then through the aperture of said hub when arranged in said container, a latch lock device secured to the other end of said axial member and including a plurality of spaced members each having an inclined surface, the other closure member including suitable openings therein in said related central area at the bottom of the corresponding cavity, through which said spaced members extend when the reel is enclosed in said container, said latch device being completely enclosed within the confines of the central area cavity of the adjacent closure member when a reel is in said container, succeeding portions of the spaced members inclined surfaces acting, upon a manual angular displacement of said manually operable member against the central area surfaces of said adjacent closure member to lock said closure members together, with said central areas being also accordingly flexed towards each other with the shoulders of the associated shoulders rigidly gripping said reel at the hub thereof to prevent axial or lateral motion thereof within said container.

References Cited in the file of this patent

UNITED STATES PATENTS

| | | |
|---|---|---|
| 1,132,766 | Delaney | Mar. 23, 1915 |
| 1,713,129 | Hope | May 14, 1929 |
| 1,843,235 | Kjellstrom | Feb. 2, 1932 |
| 1,850,074 | Crandall | Mar. 22, 1932 |
| 2,030,465 | Nist | Feb. 11, 1936 |
| 2,148,339 | Cryan | Feb. 21, 1939 |
| 2,201,305 | Springer | May 21, 1940 |
| 2,631,725 | Miller | Mar. 17, 1953 |
| 2,721,041 | Nerwin | Oct. 18, 1955 |

FOREIGN PATENTS

| | | |
|---|---|---|
| 632,156 | France | Sept. 27, 1927 |